United States Patent
Fujii et al.

(10) Patent No.: US 8,952,583 B2
(45) Date of Patent: Feb. 10, 2015

(54) BUS RING, AND FIXING STRUCTURE THEREOF

(75) Inventors: Hideki Fujii, Kusatsu (JP); Yoshiki Yasuda, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 499 days.

(21) Appl. No.: 13/258,774

(22) PCT Filed: Mar. 11, 2010

(86) PCT No.: PCT/JP2010/054109
§ 371 (c)(1),
(2), (4) Date: Sep. 22, 2011

(87) PCT Pub. No.: WO2010/110082
PCT Pub. Date: Sep. 30, 2010

(65) Prior Publication Data
US 2012/0013210 A1    Jan. 19, 2012

(30) Foreign Application Priority Data
Mar. 23, 2009    (JP) ................................. 2009-069790

(51) Int. Cl.
*H02K 3/28*    (2006.01)
*H02K 3/52*    (2006.01)

(52) U.S. Cl.
CPC ............ *H02K 3/522* (2013.01); *H02K 2203/09* (2013.01)
USPC .............................. 310/71; 310/194; 310/179

(58) Field of Classification Search
CPC .. H02K 3/18; H02K 2203/09; H02K 2203/12
USPC ............................................ 310/71, 194, 179
See application file for complete search history.

(56) References Cited

U.S. PATENT DOCUMENTS

| 7,034,419 | B2 | 4/2006 | Kabasawa et al. | |
| 7,164,217 | B2 | 1/2007 | Kabasawa et al. | |
| 7,476,995 | B2 * | 1/2009 | Uchiyama et al. | 310/71 |
| 2006/0138884 | A1 * | 6/2006 | Kabasawa et al. | 310/71 |
| 2008/0122301 | A1 * | 5/2008 | Okada et al. | 310/43 |
| 2009/0256439 | A1 * | 10/2009 | Inoue et al. | 310/71 |

FOREIGN PATENT DOCUMENTS

| JP | 11-018331 A | 1/1999 |
| JP | 2002-010607 A | 1/2002 |
| JP | 2004-096841 A | 3/2004 |
| JP | 2006-067799 A | 3/2006 |
| JP | 2006-296104 A | 10/2006 |
| JP | 2008-278691 A | 11/2008 |

* cited by examiner

*Primary Examiner* — Quyen Leung
*Assistant Examiner* — Naishadh Desai
(74) *Attorney, Agent, or Firm* — Birch, Stewart, Kolasch & Birch, LLP (57) ABSTRACT

There is provided a bus ring attached to a stator having a plurality of stator teeth aligned in a circumferential direction and a winding wound around each of the stator teeth along an end face of the stator of a rotary electrical machine in an axial direction, and the bus ring is made by curving a conductive wire in an arc shape with a diameter smaller than that of the stator, and staple-shaped bent portions are formed at the conductive wire and the winding is connected to the bent portions. There is also provided a fixing structure of the bus ring configured such that an insulator is interposed between each of the stator teeth and the winding protruding in the axial direction from the end face of the stator to enter inside the conductive wire of the bus ring.

4 Claims, 6 Drawing Sheets

BUS RING, AND FIXING STRUCTURE THEREOF

CROSS REFERENCE TO RELATED APPLICATIONS

This application is the National Phase of International Application No. PCT/JP2010/054109, filed on Mar. 11, 2010, which claims priority under 35 U.S.C. 119(a) to Patent Application No. 2009-069790, filed in Japan on Mar. 23, 2009, all of which are hereby expressly incorporated by reference into the present application.

BACKGROUND OF THE INVENTION

1. Field of the Invention

The present invention relates to a bus ring attached to a stator of a rotary electrical machine so as to connect a winding wound around a stator tooth and a fixing structure thereof.

2. Description of Related Art

In a bus ring disclosed in Japanese Unexamined Patent Application Publication Nos. JP 2004-096841 A and JP 2006-067799 A, terminals in the shape of a staple (U-shape) are formed on a conductive wire curved in an arc shape. The terminals are in the shape of protruding in a radial direction of a ring-shaped stator and a winding wound around a stator tooth is connected to the terminals. It is, however, necessary to increase the outermost diameter of the bus ring for each protruding portion of the terminals, so that space that is greater than the thickness of a core back of a stator iron core is needed. As a result, it becomes necessary to increase the inner diameter of a housing for a rotary electrical machine. Accordingly, this causes a problem of hindering the downsizing of the rotary electrical machine.

SUMMARY OF THE INVENTION

It is an object of the present invention to provide a bus ring and a fixing structure thereof to contribute downsizing of a rotary electrical machine.

In a first preferred aspect, there is provided a bus ring according to the present invention attached to a stator having a plurality of stator teeth aligned in a circumferential direction and turning an end face thereof toward an axial direction of a rotary electrical machine along the end face, the bus ring is made by curving a conductive wire in an arc shape with a diameter smaller than that of the stator, wherein staple-shaped bent portions protruding in the axial direction are formed at the conductive wire and a winding wound around each of the plurality of stator teeth is connected to the bent portions.

In a second preferred aspect of the bus ring according to the present invention, a plurality of conductive wires are respectively aligned in the axial direction.

In a third preferred aspect of the bus ring according to the present invention, respective bent portions of the plurality of conductive wires are positioned in the circumferential direction.

In a fourth preferred aspect of the bus ring according to the present invention, extending portions bent so as to respectively extend in a radial direction are formed at the plurality of conductive wires and the bent portions are formed at the conductive wires so as to be interposed between the extending portions.

In a fifth preferred aspect of the bus ring according to the present invention, the bent portions respectively have a smaller width of the circumferential direction as the bent portions protrude in the axial direction.

In a sixth preferred aspect of the present invention, there is provided a fixing structure of the bus ring according to the present invention for attaching the bus ring to a stator having a plurality of stator teeth aligned in a circumferential direction and turning an end face of the stator toward an axial direction of a rotary electrical machine along the end face, wherein the bus ring is made by curving a conductive wire in an arc shape with a diameter smaller than that of the stator, in which staple-shaped bent portions protruding in the axial direction are formed at the conductive wires and a winding wound around each of the stator teeth is connected to the bent portions, and further, an insulator extending in the axial direction from the end face of the stator is interposed between each of the stator teeth and the winding to enter the insulator inside the conductive wire.

In a seventh preferred aspect of the fixing structure of the bus ring according to the present invention, the insulator supports the plurality of conductive wires at positions spaced away from the end face of the stator in the axial direction and respective bent portions of the plurality of conductive wires are different in length of protrusion of the bent portions in the axial direction.

Advantages of the Invention

According to the present invention, there is provided a bus ring which has no possibility of staple-shaped bent portion protruding in a radial direction of a stator iron core in a state where conductive wires are attached to a stator along an end face thereof because the bent portions protruding in an axial direction of a rotary electrical machine are formed at the conductive wires curved in an arc shape with a diameter smaller than that of the outer diameter of the stator iron core. Consequently, it is sufficient to use a minimum-size housing capable of housing the stator as a housing for a rotary electrical machine, which enables to downsize the rotary electrical machine.

In addition, the bus ring of the present invention is capable of attaching fittings, typically, for screwing windings to the staple-shaped bent portions. Since it is possible to perform a task for connecting windings to such fittings outwards in the radial direction of the stator, the operator can smoothly connect the windings to the fittings because there is no interruption of the operator's hands caused by the stator. Further, it is possible to perform a task for connecting the windings to a plurality of bent portions formed at the conductive wire from a front face of each of the bent portions, so that it is possible for the operator to connect the windings to all of the bent portions in the same manner. This makes it easier to finish portions where the windings are connected to the bent portions in high grade.

Moreover, in the case where the rotary electrical machine has windings of at least two phases, there is no possibility of a plurality of conductive wires protruding in the radial direction of the stator by axially aligning the conductive wires. This makes it possible to downsize the rotary electrical machine regardless of the number of the conductive wires. Furthermore, there are advantages that it is possible to avoid the bent portions being overlapped and being an obstacle to other conductive wires when performing the aforementioned task in the bent portions of one conductive wire out of the plurality of conductive wires by aligning the plurality of conductive wires such that the respective bent portions of the plurality of conductive wires can be arranged in a circumferential direction.

According to the bus ring of the present invention, the conductive wires respectively have extending portions extending in the radial direction and bent portions interposed between the extending portions, which makes it possible to secure an insulation distance which will be described later. That is, in the case where a plurality of conductive wires are aligned in the axis direction, respective extending portions of these conductive wires radially extend. As a result, it is possible to keep an insulation distance which is essential to insulation between the bent portions of one conductive wire out of the plurality of conductive wires and other conductive wires even when approaching the conductive wires each other. This avoids the rotary electrical machine being unnecessarily long in the axial direction, resulting in downsizing of the rotary electrical machine.

In addition, the bent portions may be in a shape of gradually reducing the width in the circumferential direction thereof as the bent portions axially protrude. In this case, for instance, each of the bent portions can be nipped in each of the fittings by allowing the fittings for connecting the windings to enter the bent portions and be pressed in the direction of projection of the bent portions. As a result, it is possible to easily perform positioning of the fittings with respect to the bent portions.

According to the fixing structure of the bus ring of the present invention, it is possible to support the plurality of conductive wires at positions spaced away from an end face of the stator in the axial direction. In this case, regardless of an increase or a decrease of the number of the conductive wires, there is no possibility of each conductive wire protruding in the radial direction of the stator because it is possible to axially align the plurality of conductive wires. Accordingly, the housing of the rotary electrical machine with a minimum internal diameter that is capable of housing the stator may be used, resulting in downsizing of the entire rotary electrical machine. There are further advantages that it is not necessary to enlarge the width or the diameter of each of the conductive wires for each protruded portion of the respective bent portions to enter the support of an insulator inside the conductive wires because the bent portions of the bus ring axially protrude.

Additionally, according to the fixing structure of the bus ring of the present invention, the respective bent portions of the plurality of conductive wires are different in length of protrusion of the bent portions in the axial direction. This makes it possible to set desirable space between the bent portions of respective conductive wires and the end face of the stator. For instance, it is possible to uniformly align the aforementioned space by long-protruding the bent portions thereof from the conductive wires in the axial direction as long as the plurality of conductive wires are relatively spaced away from the end face of the stator.

It is also possible to support the conductive wires by an insulator in a state where the insulator enters inside the conductive wires when the insulator is interposed between the stator tooth and the winding. In this case, it is possible to reduce the number of parts for the rotary electrical machine because a holder or the like for attaching the conductive wires to the stator is not needed.

BRIEF DESCRIPTION OF THE DRAWINGS

FIG. 6($a$) is a plan view of bent portions of a bus ring of an embodiment of the present invention; and FIG. 6($b$) is a side view thereof.

DESCRIPTION OF THE PREFERRED EMBODIMENTS

Figure 1:
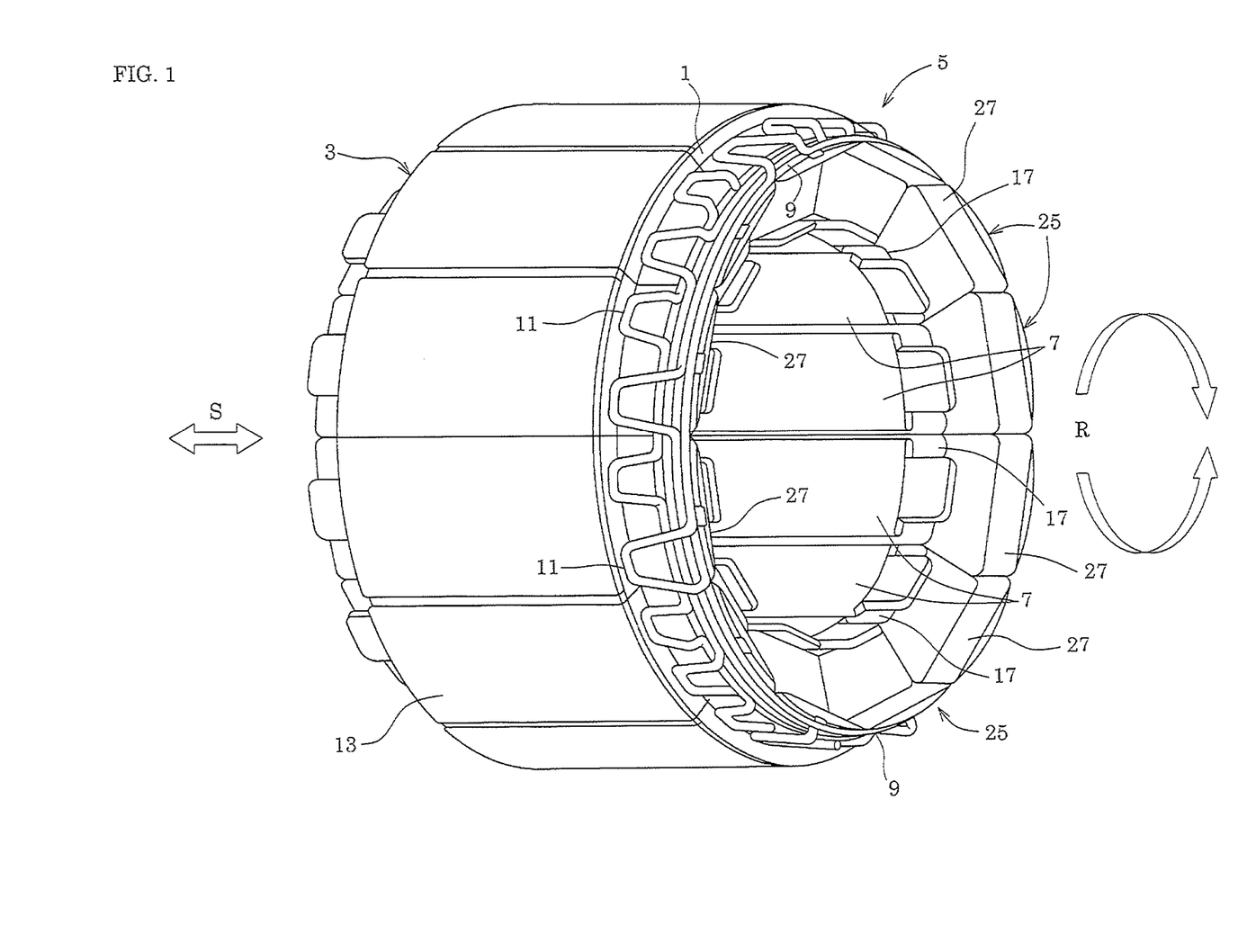
FIG. 1 is a perspective view showing an example in which a bus ring of an embodiment of the present invention is attached to a stator of a rotary electrical machine.
Figure 2:
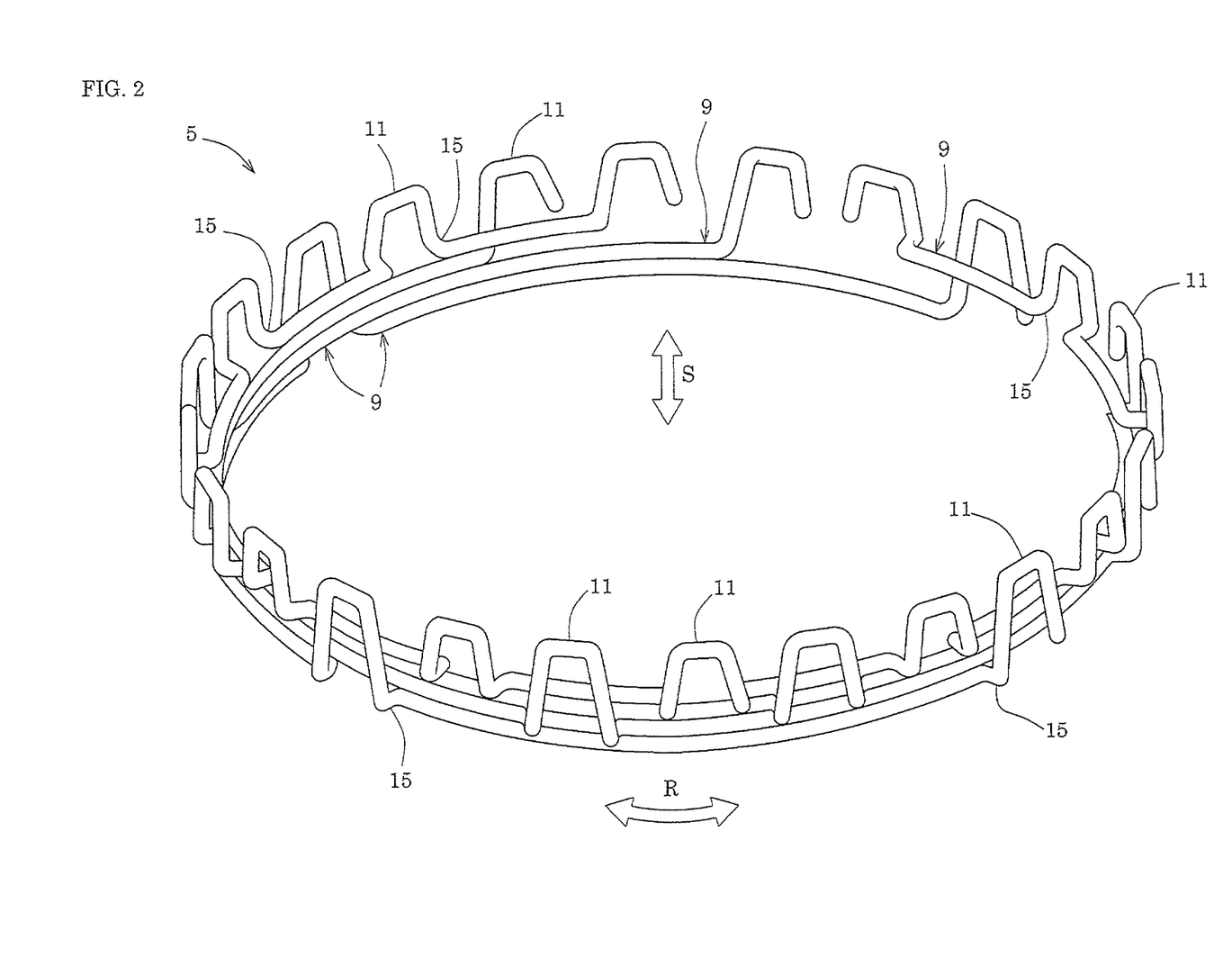
FIG. 2 is a perspective view of a bus ring of an embodiment of the present invention.

FIG. 1 shows a ring-shaped stator 3 turning an end face 1 thereof toward an axial direction of a rotary electrical machine pointed by an arrow S and a bus ring 5 attached to the stator 3 along the end face of the stator 3. In the stator 3, a plurality of stator teeth 7 are aligned in a circumferential direction indicated by an arrow R. FIG. 2 shows the bus ring 5 removed from the stator 3. Although the aforementioned rotary electrical machine is not shown in figure due to obvious art, the rotary electrical machine may house the stator 3 inside the housing and rotate an output shaft together with a rotor.

Figure 3:
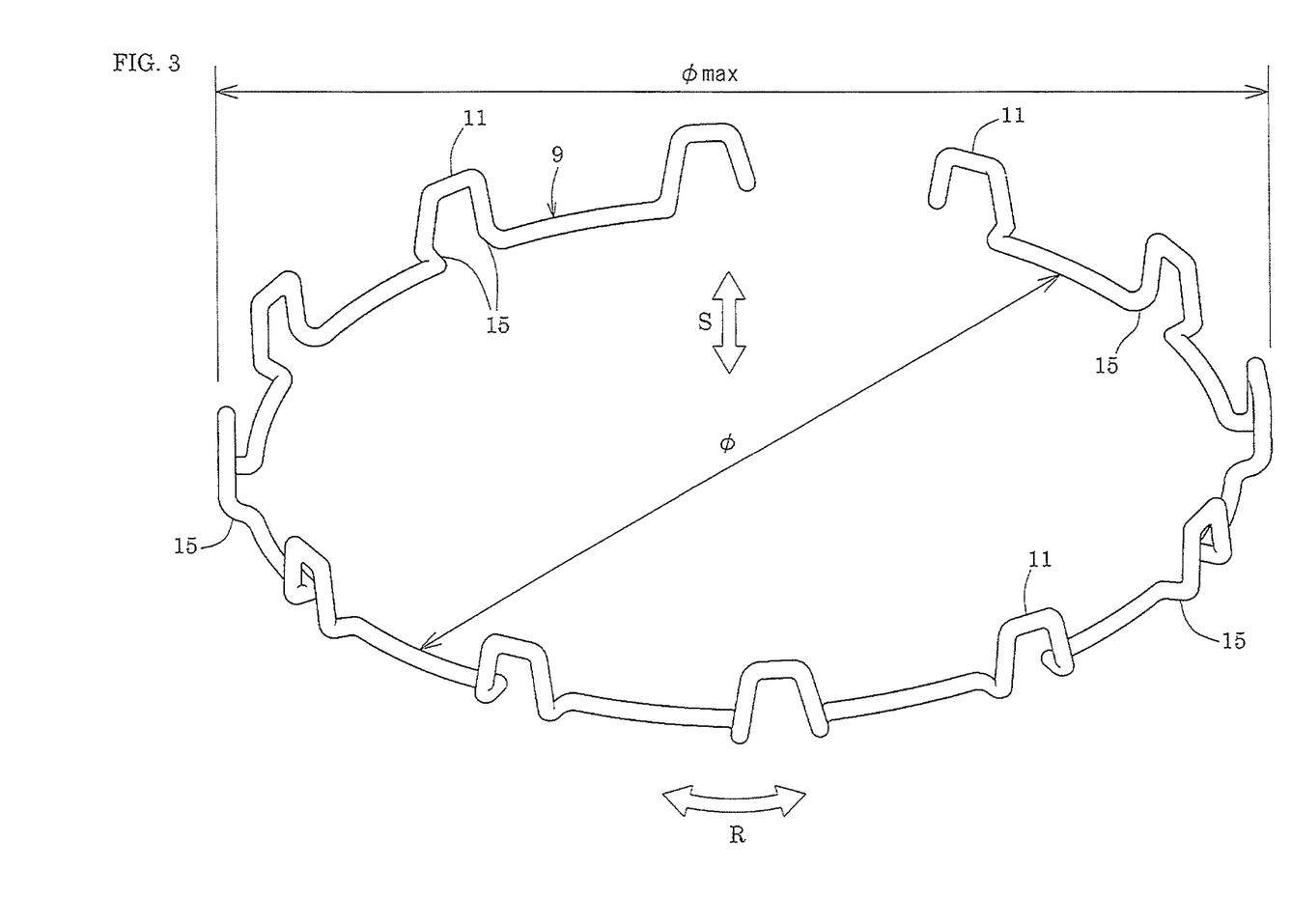
FIG. 3 is a perspective view showing one conductive wire applied to a bus ring of an embodiment of the present invention.

As shown in FIG. 2, the bus ring 5 includes four conductive wires 9 curbed in the shape of an arc. As shown in FIG. 3, each of the conductive wires 9 has a plurality of staple-shaped bent portions 11 protruding in an axial direction. The shape of an arc herein means a shape following a circle having a diameter of "φ". The symbol "φ" indicates the diameter of each of the conductive wires 9 and is set to be smaller than the diameter of an outer circumferential surface 13 of the stator 3 shown in FIG. 1. The material for each of the conductive wires 9 is a conductor made of copper or the like and a surface of each of the conductive wires 9 may be covered with an insulating material. The cross section of each of the conductive wires 9 may be in the shape of a circle, an ellipse or a polygon.

Further, each of the conductive wires 9 may have extending portions 15 extending in a radial direction thereof and bent portions 11 respectively interposed between the extending portions 15. In this case, the diameter [φ max] of a circle circumscribing the outermost side of the radial direction of each of the conductive wires 9 is preferably smaller than the diameter of the outer circumferential surface 13 of the stator 3.

Figure 4:
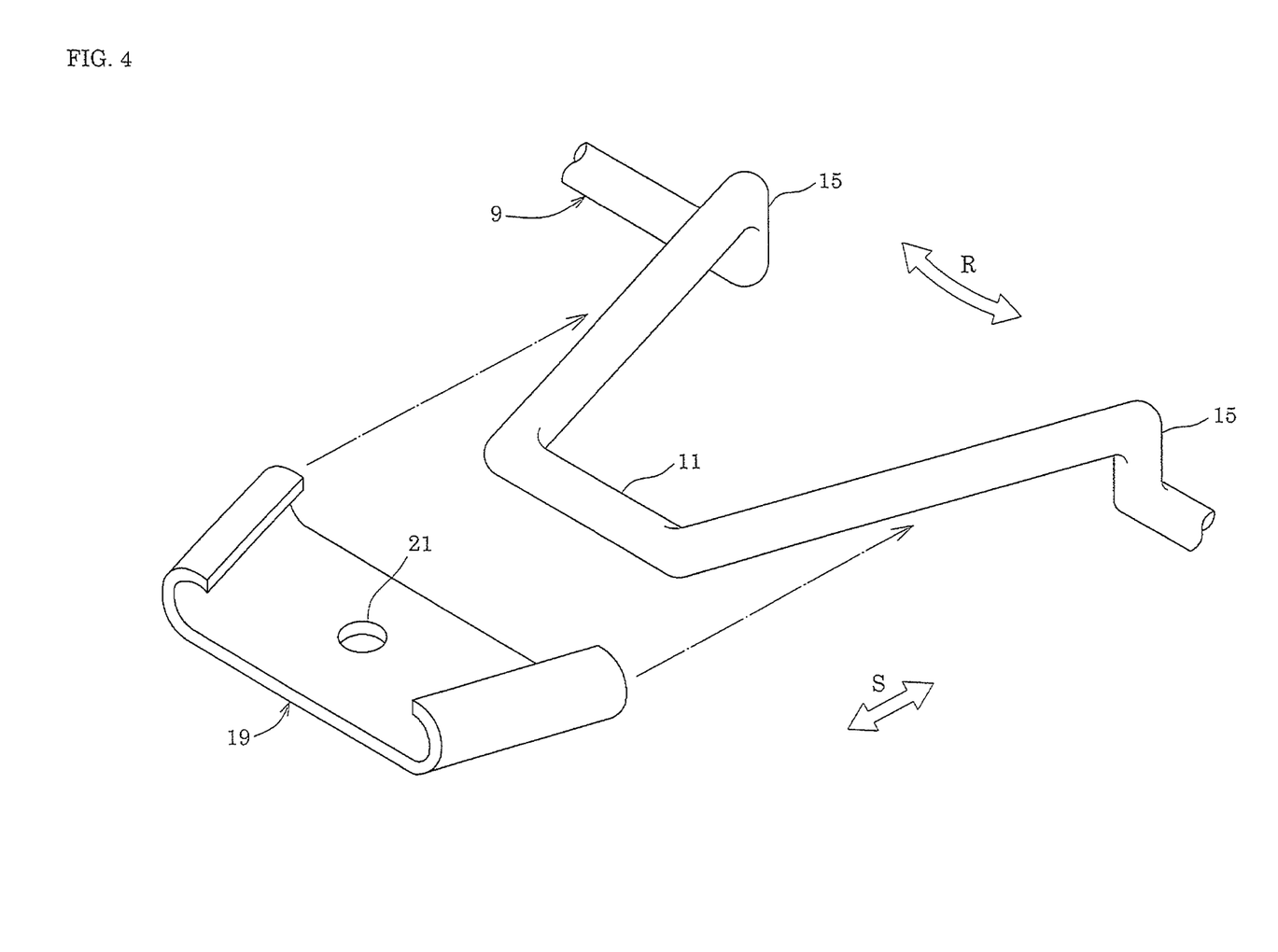
FIG. 4 is an exploded perspective view of a usage example of bent portions of a bus ring of an embodiment of the present invention.

The bent portions 11 are portions to which windings 17 would around the stator teeth 7 shown in FIG. 1 are connected, therefore, it is possible to attach fittings or the like for screwing ends of the windings 17. As shown in FIG. 4, the width of the circumferential direction of a bent portion 11 is preferably reducing gradually as the bent portion 11 protrudes in the axial direction. For example, in the case where a fitting 19 with both sides bent into a hook is subject to resistance welding to the bent portion 11, it is possible to nip the bent portion 11 inside the fitting 19 simply by allowing the bent portion 11 to enter inside the fitting 19. This enables easy positioning of the fitting 19 relative to the bent portion 11. And the fitting 19 has a hole 21 and the ends of the winding 17 are connected to the fitting 19 in a manner which will be described later.

As mentioned above, work for positioning the fitting 19 in the bent portion 11 and work for connecting the winding 17 to the fitting 19 can be done from outward of the radial direction of the stator 3. This makes an operator possible to smoothly connect the winding 17 to the fitting 19 without blocking the operator's hands by the stator 3. Moreover, the operator is able to connect the windings 17 to all of the bent portions 11 in the same manner because it is possible to do the aforementioned work from a front surface of each of the bent portions 11. As a result, it is easy to finish all places where the ends of the windings 17 are connected to the conductive wires 9 in high quality.

The number of the conductive wires 9 shown in FIGS. 1 and 2 is set to be four because each of the windings 17 in the U-phase, V-phase, W-phase, and N-phase of the rotary electrical machine is connected to one conductive wire 9. In addition, the bus ring 5 may have one or more conductive wires 9 and the number of the conductive wires 9 may be increased or decreased according to the specifications of the rotary electrical machine.

Figure 5:
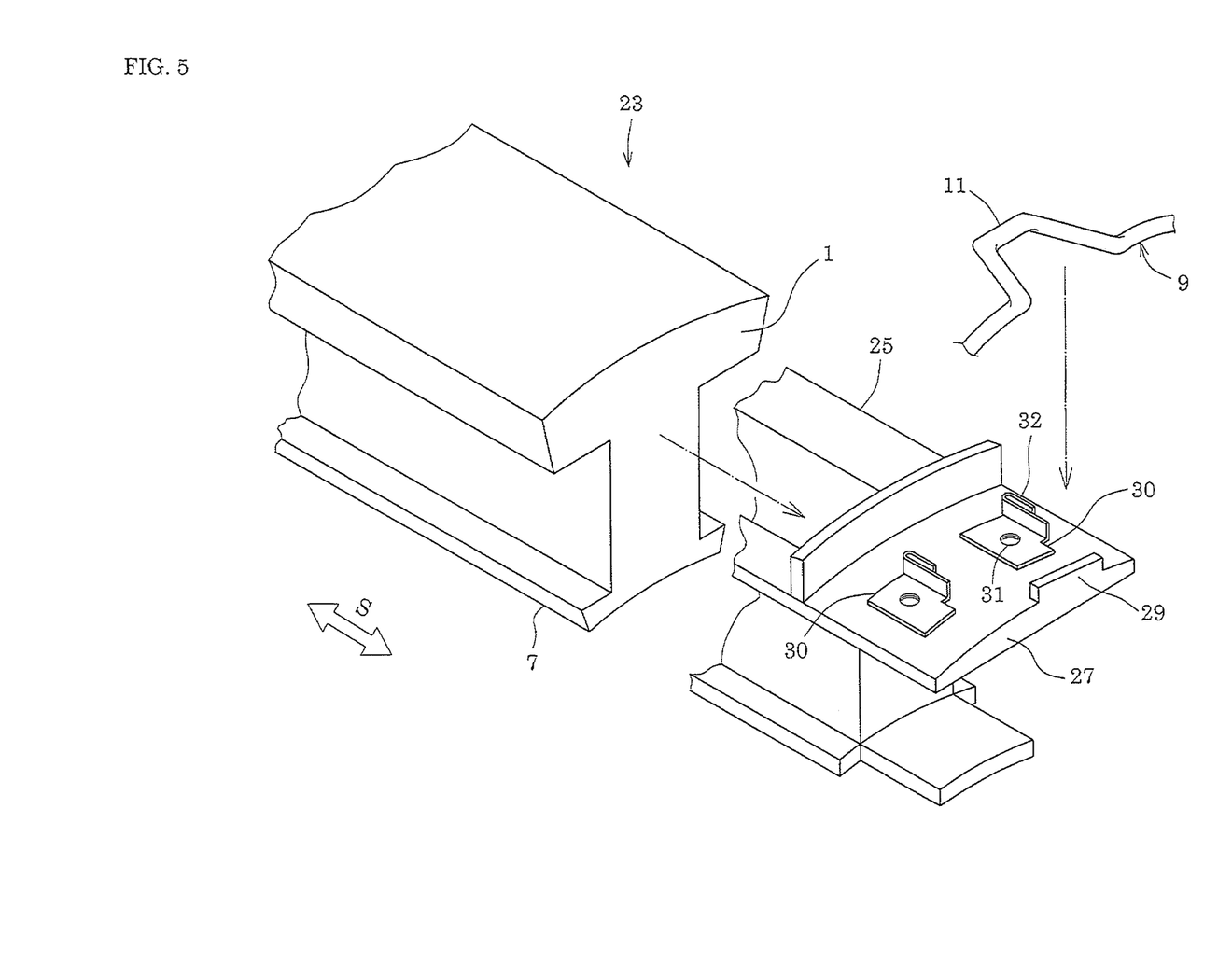
FIG. 5 is an exploded perspective view showing a major part of a fixing structure of a bus ring of an embodiment of the present invention.

Next, a fixing structure 23 of a bus ring for attaching one or a plurality of conductive wires 9 to the stator 3 will now be described based on FIGS. 1 and 5. An insulator 25 is interposed between a stator tooth 7 and a winding 17. This point is applied to all stator teeth 7. Insulators 25 are respectively a bobbin made of a synthesized resin around which the windings 17 are wound and respectively have a support 27 protruding in the axial direction from the end face 1 of the stator 3. Alternatively, only supports 27 of the insulators 25 may be respectively made of a synthesized resin and the supports 27 and separated insulating paper may wrap the stator 3.

Respective supports 27 of a plurality of insulators 25 shown in FIG. 1 are arranged in a cylindrical shape to enter inside the conductive wires 9. Since the conductive wires 9 are supported by the insulators 25 in this state, a holder or the like to attach the conductive wires 9 to the stator 3 is not needed. As a result, it is possible to reduce the number of parts for the rotary electrical machine. While the means for fixing the conductive wires 9 to the insulators 25 is not particularly limited, winding fittings 30 respectively having screw holes 31 and terminals 32 may be fixed to the supports 27 of the insulators 25. And then a screw is put through the hole 21 of the fitting 19 shown in FIG. 4 to be screwed up to the screw holes 31 of the winding fittings 30. This allows the fitting 19 positioned in the conductive wire 9 to be fixed to the support 27 through a winding fitting 30. The terminals 32 of the winding fittings 30 are portions to connect the ends of the windings 17. A numerical symbol 29 indicates a claw for positioning the conductive wires 9 in the supports 27 by engaging claws into the inside of the bent portions 11.

Furthermore, there is no possibility of each of the conductive wires 9 protruding in the radial direction of the stator 3 because it is possible to align the plurality of conductive wires 9 in the axial direction even though the number of the plurality of conductive wires 9 is increased or decreased. Consequently, the housing for a rotary electrical machine having a minimum inner diameter that enables the stator 3 to be housed may be sufficient, resulting in downsizing of the whole rotary electrical machine. In addition, there is an advantage of no need for enlarging the diameter of each of the conductive wires 9 for each protruded portion of the bent portions 11 to allow each of the supports 27 of the insulators 25 to enter inside each of the conductive wires 9 because the bent portions 11 protrude in an axial direction from the conductive wires 9.

According to the fixing structure 23 of the bus ring, it is possible to avoid the bent portions 11 being overlapped to each other by aligning the positions of the respective bent portions 11 of the plurality of the conductive wires 9. Accordingly, when each of the windings 17 is connected to one bent portion 11 of one conductive wire out of the plurality of conductive wires 9, there is no possibility of the bent portions 11 of one conductive wire out of the plurality of the conductive wires 9 being blocked by the bent portions 11 of the other conductive wires 9.

Figure 6:
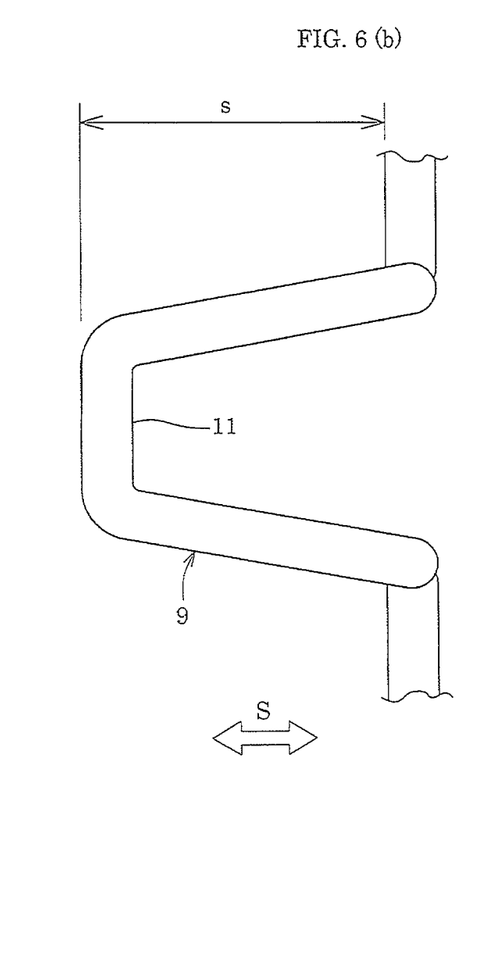

Additionally, as shown in FIGS. 6(a) and 6(b), [d] denotes a length in which an extending portion 15 extends in a radial direction thereof and [s] denotes a length in which a bent portion 11 protrudes in an axial direction thereof. The plurality of conductive wires 9 supported by the insulators 25 respectively have the length [d] of the extending portion 15. Therefore, as shown in FIGS. 1 and 2, an insulation distance essential to insulation is kept between the bent portions 11 of one conductive wire out of the plurality of conductive wires 9 and the other conductive wires 9. Consequently, according to the fixing structure 23 of the bus ring, it is not necessary for the rotary electrical machine to be excessively long in the axial direction, resulting in downsizing of the rotary electrical machine. Further, as shown in FIG. 1, it is possible to uniformly align space between the end face 1 of the stator 3 and the bent portions 11 of each of the conductive wires 9 by lengthen the length [s] of the bent portions 11 as a conductive wire out of the plurality of conductive wires 9 being relatively spaced away from the end face 1 of the stator 3.

It is to be understood that the present invention may be practiced in an embodiment in which various modifications, alterations or variations are added based on knowledge of a person having ordinary skill in the art without departing the spirits and scope of the present invention. For instance, extending portions 15 may be omitted in the bus ring 5. Further, the number of the bent portions 11 included in one conductive wire 9 is not limited.

INDUSTRIAL APPLICABILITY

The present invention is applicable to rotary electrical machines.

DESCRIPTION OF THE SYMBOLS

1: end face; 3: stator; 5: bus ring: 7: stator tooth; 9: conductive wire; 11: bent portion; 13: outer circumferential surface: 15: extending portion; 17: winding; 19: fitting; 21: hole; 23: fixing structure of bus ring; 25: insulator; 27: support; 30: winding fitting; 31: screw hole; 32: terminal

What is claimed is:

1. A bus ring attached to a stator having a plurality of stator teeth aligned in a circumferential direction and an end face thereof turned toward an axial direction, which is the direction of an axis about which a rotary electrical machine rotates a drive shaft, the bus ring being attached to the stator along the end face, the bus ring being made by curving a plurality of conductive wires in an arc shape with a diameter smaller than that of the stator, wherein the plurality of conductive wires are respectively aligned in the axial direction, wherein extending portions bent so as to respectively extend in a radial direction are formed at the plurality of conductive wires and respective bent portions are formed in the conductive wires so as to be interposed between the extending portions, and wherein staple-shaped bent portions protruding in the axial direction are formed at the plurality of conductive wires from the extending portions and a winding wound around each of the plurality of stator teeth is connected to the bent portions.

2. A bus ring attached to a stator, which has a plurality of stator teeth aligned in a circumferential direction and an end face thereof turned toward an axial direction of an axis of a rotary electrical machine rotates along the end face, the bus ring being made by curving a conductive wire in an arc shape with a diameter smaller than that of the stator, wherein staple-shaped bent portions protruding in the axial direction are formed at the conductive wire, and a winding wound around each of the plurality of stator teeth is connected to the bent portions, and wherein the bent portions respectively have a smaller width of the circumferential direction as the bent portions protrude in the axial direction.

3. A fixing structure of a bus ring for attaching a bus ring to a stator having a plurality of stator teeth wound around by a winding that are aligned in a circumferential direction and an end face of the stator turned toward an axial direction, which is the direction of an axis about which a rotary electrical machine rotates a drive shaft, the bus ring being attached to the stator along the end face, the fixing structure of the bus ring comprising:

a bus ring made by curving a conductive wire in an arc shape with a diameter smaller than that of the stator, in which extending portions bent so as to respectively extend in a radial direction are formed at a plurality of conductive wires and staple-shape bent portions protruding in the axial direction from the extending portions and respectively having smaller width of the circumferential direction as the bent portions protrude in the axial direction;

an insulator interposed between each of the stator teeth and the winding in the stator, the insulator having a support protruding in the axial direction from the end face of the stator; and a plurality of fittings with both ends bent into a hook-shape and connected to the winding, wherein a support of the insulator is arranged to enter inside the conductive wires and the conductive wires are supported by the insulator in this state, and the bent portions of the conductive wires are interposed between both sides of the plurality of fittings to fix the fittings to the support of the insulator.

4. The fixing structure according to claim 3, wherein the insulator supports the plurality of conductive wires respectively aligned in the axial direction at positions spaced away from the end face of the stator in the axial direction and respective bent portions of the plurality of conductive wires are positioned in the circumferential direction and different in length of protrusion of the bent portions in the axial direction.

* * * * *